US011659505B2

(12) United States Patent
Chauhan et al.

(10) Patent No.: US 11,659,505 B2
(45) Date of Patent: May 23, 2023

(54) METHOD AND SYSTEM FOR SYNCHRONIZATION OF SMALL CELL

(71) Applicant: JIO PLATFORMS LIMITED, Ahmedabad (IN)

(72) Inventors: Devesh Chauhan, Mumbai (IN); Veera Sai Satyanarayana Prasad Marni, Mumbai (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 271 days.

(21) Appl. No.: 16/892,074

(22) Filed: Jun. 3, 2020

(65) Prior Publication Data

US 2020/0383072 A1   Dec. 3, 2020

(30) Foreign Application Priority Data

Jun. 3, 2019  (IN) .............................. 201921022035

(51) Int. Cl.
| | |
|---|---|
| *H04W 56/00* | (2009.01) |
| *H04W 76/11* | (2018.01) |
| *H04W 4/80* | (2018.01) |
| *H04L 5/00* | (2006.01) |

(52) U.S. Cl.
CPC ......... *H04W 56/001* (2013.01); *H04L 5/0051* (2013.01); *H04W 4/80* (2018.02); *H04W 56/005* (2013.01); *H04W 76/11* (2018.02)

(58) Field of Classification Search
CPC ... H04L 5/0051; H04L 5/0023; H04L 5/0032; H04L 5/0048; H04L 5/008; H04L 27/2655; H04W 56/001; H04W 4/80; H04W 56/005; H04W 76/11; H04W 4/70; H04W 84/045; H04W 92/20
See application file for complete search history.

(56) References Cited

U.S. PATENT DOCUMENTS

| | | | | |
|---|---|---|---|---|
| 2009/0097452 | A1* | 4/2009 | Gogic ................. | H04W 56/004 370/336 |
| 2010/0278132 | A1* | 11/2010 | Palanki ................ | H04L 5/0053 370/329 |
| 2014/0226636 | A1* | 8/2014 | Xu ....................... | H04W 72/042 370/336 |
| 2017/0093540 | A1* | 3/2017 | Lei ....................... | H04L 27/2655 |
| 2017/0373900 | A1* | 12/2017 | Adhikary ............ | H04L 27/2613 |
| 2018/0270772 | A1* | 9/2018 | Ly ......................... | H04L 5/0048 |

* cited by examiner

*Primary Examiner* — Rina C Pancholi
(74) *Attorney, Agent, or Firm* — Klarquist Sparkman, LLP (57) ABSTRACT

System and method for synchronizing at least one small cell with at least one macro cell in a heterogeneous network. The method comprises the at least one small cell triggering an NB-IoT modem for a clock reference signal. The NB-IoT modem detects a first synchronization signal and a second synchronization signal, the first synchronization signal and the second synchronization signal being transmitted by at least one NB-IoT cell connected to the at least one macro cell. The NB-IoT modem synchronizes the at least one small cell with the at least one macro cell based on at least one of the first synchronization signal and the second synchronization signal.

14 Claims, 8 Drawing Sheets

METHOD AND SYSTEM FOR SYNCHRONIZATION OF SMALL CELL

CROSS REFERENCE TO RELATED APPLICATIONS

This application claims priority to Indian Patent Application No. 201921022035, filed Jun. 3, 2019, the disclosure of which is hereby incorporated by reference herein in its entirety.

FIELD

The embodiments generally relate to wireless communication networks, and more particularly relates to synchronization of small cells with macro cells in a Heterogeneous Network (HetNet).

BACKGROUND

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

In a traditional cellular deployment, suitable-powered macro cells are being deployed to cover sufficiently large areas. However, macro cells-only deployment suffer quick capacity degradation as the number of user equipments operating in the macro cell coverage areas increase. Therefore, telecom operators are reinforcing the macro cells deployment with one or more low powered small cellular cells (generally termed as Femto/Pico/Micro cell) placed at multiple strategic locations within one or more macro coverage areas. The reinforced cellular network is termed as Heterogeneous network (HetNet). For a typical HetNet, strategic locations for small cells generally include areas with a high density of users, such as shopping malls, airports, railway/bus stations, colleges, etc. Also, the locations might include an area with dead-spots, or areas with low macro signal strength, such as indoor establishments or peripheral locations of a macro coverage area. Reinforced with small cells placed at multiple strategic locations as described above, HetNet provides increased mobile data capacity along with better mobile coverage, thereby enhancing the overall user's mobile broadband experience.

In the mobile communication network, it may often be difficult for the operators to cater high user throughput and to maintain acceptable signal quality throughout the homogeneous deployment of only macro base stations, especially in areas of high user density or with high building penetration loss. The small base station (or, small cell) when used along with macro base stations serve the dual purpose of enhanced capacity and coverage as well as reduced capital expenditure and operating costs. The service operators are increasingly deploying small base stations in larger numbers to cater to the localized area of high user density e.g. offices, shopping complexes etc.

Recently, 3GPP has introduced a new technology NB-IoT in release 13 for low-end IoT applications with better performance than Low Power Wide Area technology (LPWA). The NB-IoT technology has been implemented in licensed bands of LTE. This technology makes use of a minimum system bandwidth of 180 kHz i.e. one PRB (Physical Resource Block) The NB-IoT can be deployed in 3 modes as described in the FIG. 2 below: "in-band", "guard band" and "standalone". In the "in-band" operation, resource blocks present within LTE carrier are used. The inner resource blocks are not used as they are allotted for synchronization of LTE signals. In "guard band" operation, resource blocks between LTE carriers that are not utilized by any operator are used. In "standalone" operation, GSM frequencies are used, or possibly unused LTE bands are used. Release 13 of 3GPP contains important refinements like discontinuous reception (eDRX) and power save mode. The PSM (Power Save Mode) ensures battery longevity in release 12 and is completed by eDRX for devices that need to receive data more frequently.

The NB-IoT technology addresses some of the key IoT requirements, for instance, the battery lifetime of the devices increases, improved network coverage, cost of the devices is reduced, multiplexing of devices met for capacity requirements, and supporting a massive number of devices. The NB-IoT technology support low power consumption, use of low-cost devices and provides excellent coverage. For example, in an NB-IoT deployment, the NB-IoT cells have a 20 dB gain over other categories like CAT 4/3/1 cells. As such, the NB-IoT Carrier can support much larger areas when compared to a CAT 4/3/1 base station or channel. Typically, in NB-IOT scenario, the same base station provides the NB-IoT channels for a device. The same or a different base station can provide a channel for a CAT-1 or a CAT 3/4 operation due to the difference in the NB-IoT and other category cell coverage areas.

Another key benefit of NB-IoT devices include energy optimization feature for operating the NB-IoT device on low-power consumption during a sleep mode as well as when the NB-IoT device is transmitting over the network. While other cellular technologies like LTE-M focus on saving power by sleeping and limiting their transmit time and frequency, the NB-IoT focus on its ability to sleep (with support for Extended Discontinuous Reception (eDRX)) and minimize power consumption during data transmission, primarily due to the simplified data transmission method and lower data rate, which reduces the need to do power-hungry signal processing and improves the overall efficiency of the system. Secondly, NB-IoT possesses less complex radio design with a single antenna and are, accordingly, less expensive than other cellular technologies, reducing the barrier to integrate low-power cellular technology into their solutions. And thirdly, NB-IoT also provides improved range and obstacle penetration. Along with its reduced data rates and simplified radio design, NB-IoT has stronger link budgets than other cellular technologies, leading to greater coverage and strong building penetration, great for applications with devices deployed in difficult to reach places.

Providing high spectral efficiency and smooth performance of mobile networks requires accurate and reliable frequency and timing synchronization. The LTE systems employ an Orthogonal Frequency-Division Multiplexing (OFDM) physical layer in the Downlink (DL) for making an accurate frequency synchronization to rectify any mismatch between the two local oscillators at the transmitter and the receiver introduces a Carrier Frequency Offset (CFO). The CFO destroys the orthogonality between subcarriers and degrades the system performance severely. The TD-LTE systems requires additional and even more stringent requirement for time synchronization as well. 3GPP TS 36.104 has outlined the frequency and timing synchronization accuracy requirement, of LTE Base Station (BS) as illustrated below in Table 1 & Table 2.

TABLE 1

Frequency Synchronization Requirements

| BS Class | Frequency Accuracy (ppm) |
| --- | --- |
| Wide Area BS | ±0.05 |
| Local Area BS | ±0.1 |
| Home Area BS | ±0.25 |

TABLE 2

Timing Synchronization Requirements

| BS Class | Propagation Distance | Timing Accuracy (μsec) |
| --- | --- | --- |
| Wide Area | ≤3 km | 3 |
|  | >3 km | 10 |
| Home Area | ≤500 m | 3 |
|  | >500 m | $1.3 + T_{propagation}$ |

$T_{propagation}$ is the propagation delay between the Home BS and the Base Station selected as the network listening synchronization source. The known synchronization techniques available for small base stations e.g. GNSS, IEEE 1588 v2, and Network Listening/RF Sniffing are often expensive and have limitations that make them unfit in certain deployment scenarios. For instance, while satellite GNSS (such as GPS) can provide accurate synchronization, however, it usually requires visible sight of the sky from the small cell device which might be placed indoor and therefore, does not always work in indoor scenarios. In another instance, under good back-haul conditions (like operator-controlled fiber) IEEE 1588 v2 (Precision Clock Synchronization Protocol) can provide sub-microsecond level accuracy, however, such good backhaul conditions may not always be possible as the non-ideal backhauls over cable and DSL modems have significant jitter and delay variations. Furthermore, it suffers from unsymmetrical upstream and downstream delay resulting in an error that may be up to many milliseconds. This render backhauls restricted from being used for TD-LTE synchronization.

In yet another instance of Network Listening/RF Sniffing, an unsynchronized base station can derive its timing by periodically listening to the synchronization or reference signal from another synchronized base station known as synchronization source, however, it is now always possible for a base station to listen directly to the primary synchronization source. In such situation, synchronization is achieved over multiple hops via a cascaded chain of base stations with each one of them tracking the other for synchronization and finally terminating at the primary synchronization source. In the case of multi-hop synchronization, the concept of synchronization stratum is used. The synchronization stratum of a particular Base Station is defined as the smallest number of hops between that Base Station and the GPS source. Thus, the synchronization stratum of a particular Base Station is one greater than its donor Base Station that it is tracking. The Base Station tries to track the synchronization from the available Base Station with the lowest stratum level, which in turn allows it to be as close to GNSS time as possible. Network listening can be used in scenarios where GPS and IEEE 1588 v2 do not work. For this reason, network listening is an essential synchronization scheme for Small Base Stations in heterogeneous networks (HetNet). However, the accuracy of this scheme deteriorates in multi-hop synchronization as the stratum level of the donor Base Station increases. Also, the crystals used in the small base stations have holdover time far greater than the maximum synchronization time. Therefore, in the current system, there exists a major challenge to provide error-free synchronization to small base stations without losing the accuracy. The synchronization accuracy in deep indoors is inherently prone to cascaded inaccuracies introduced at every hop when synchronization stratum of the donor base stations is higher. Thus, the existing solutions fail to provide synchronization solutions to the small base stations, which are often in deep indoor, and therefore, there exists a need for a system and a method for synchronizing a small cell with at least one macro cell in a heterogeneous network.

SUMMARY

This section is provided to introduce certain objects and aspects of the present invention in a simplified form that are further described below in the detailed description. This summary is not intended to identify the key features or the scope of the claimed subject matter.

In order to overcome at least a few problems associated with the known solutions as provided in the previous section, an object of the present invention is to provide a method and a system for synchronizing at least one small cell with at least one macro cell in a heterogeneous network. Another object of the present invention is to provide a method and a system for error-free and accurate synchronization of Small Base Stations without losing the accuracy. Yet another object of the present invention is to provide a method and a system for synchronization of small base stations in deep indoors. Yet another object of the present invention is to provide a system and method for synchronization of small base stations with a Maximum Coupling Loss (MCL) of 164 dB, and to provide a coverage extension of 20 dB compared to legacy LTE systems. Yet another object of the present invention is to provide a system and a method of synchronization solution for small base stations at low cost and power. Yet another object of the present invention is to provide a system and a method of improved synchronization range and obstacle penetration for greater range/coverage and strong building penetration.

In order to achieve the aforementioned objectives, the present invention provides a method and system for mitigation of at least one aggressor cell. A first aspect of the present invention relates to a method for synchronizing at least one small cell with at least one macro cell in a heterogeneous network, the method comprising triggering, by the at least one small cell, at least one NB-IoT modem connected to the at least one microcell for a clock reference signal. The NB-IoT modem detects a first synchronization signal, wherein the first synchronization signal is transmitted by at least one NB-IoT cell connected to the at least one macro cell, and the first synchronization signal comprises at least one of a cell identifier information and an initial timing information. The NB-IoT modem detects a second synchronization signal, wherein the second synchronization signal is transmitted by the at least one NB-IoT cell connected to the at least one macro cell, and the second synchronization signal comprises a residual time offset. The NB-IoT modem synchronizes the at least one small cell with the at least one macro cell based on at least one of the first synchronization signal and the second synchronization signal transmitted by the at least one NB-IoT cell.

Another aspect of the present invention relates to a system for synchronizing at least one small cell with at least one macro cell in a heterogeneous network. The system comprises the at least one macro cell, at least one micro cell, at least one NB-IoT cell and at least one NB-IoT modem. The at least one NB-IoT cell is configured to transmit at least one of a first synchronization signal and a second synchronization signal, wherein the first synchronization signal comprises at least one of a cell identifier information and an initial timing information, and the second synchronization signal comprises a residual time offset. The NB-IoT modem is configured to detect at least one of the first synchronization signal and the second synchronization signal. The NB-IoT modem is further configured to synchronize the at least one small cell with the at least one macro cell based on at least one of the first synchronization signal and the second synchronization signal. The at least one small cell is connected to the NB-IoT modem, said at least one small cell is configured to trigger an NB-IoT modem for a clock reference signal.

Yet another aspect of the present invention relates to a small cell comprising a memory unit, a processor and an NB-IoT modem, said components are connected to each other. The processor is configured to generate for a trigger for a clock reference signal. The NB-IoT modem is configured to receive the trigger for the clock reference signal. The NB-IoT modem is also configured to detect at least one of the first synchronization signal and the second synchronization signal, wherein the first synchronization signal comprises at least one of a cell identifier information and an initial timing information, and the second synchronization signal comprises a residual time offset. The NB-IoT modem is also configured to synchronize the at least one small cell with the at least one macro cell based on at least one of the first synchronization signal and the second synchronization signal.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

The foregoing shall be more apparent from the following more detailed description of the invention.

BRIEF DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As utilized herein, terms "component," "system," "platform," "node," "layer," "selector," "interface," and the like are intended to refer to a computer-related entity, hardware, software (e.g., in execution), and/or firmware. For example, a component can be a process running on a processor, a processor, an object, an executable, a program, a storage device, and/or a computer. By way of illustration, an application running on a server and the server can be a component. One or more components can reside within a process and a component can be localized on one computer and/or distributed between two or more computers.

Further, these components can execute from various computer-readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software application or a firmware application executed by a processor, wherein the processor can be internal or external to the apparatus and executes at least a part of the software or firmware application. As yet another example, a component can be any apparatus that provides specific functionality through electronic components without mechanical parts, the electronic components can include a processor therein to execute software or firmware that confers at least in part the functionality of the electronic components.

As used herein, the term "infer" or "inference" refers generally to the process of reasoning about or inferring states of the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action or can generate a probability distribution over states of interest based on a consideration of data and events, for example. Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, magnetic storage devices, e.g., hard disk; floppy disk; magnetic strip(s); optical disk (e.g., compact disk (CD), digital video disc (DVD), Blu-ray Disc™ (BD); smart card(s), flash memory device(s) (e.g., card, stick, key drive).

Moreover, terms like "user equipment" (UE), "mobile station," "mobile subscriber station," "access terminal," "terminal," "handset," and similar terminology refer to a wireless device utilized by a subscriber or user of a wireless communication service to receive and/or convey data associated with voice, video, sound, and/or substantially any data-stream or signalling-stream. Further, the foregoing terms are utilized interchangeably in the subject specification and related drawings.

The terms "node", "local wireless communications cite," "access point" (AP), "base station," "Node B," "evolved Node B," "home Node B" (HNB), "home access point" (HAP), and the like are utilized interchangeably in the subject specification and drawings and refer to devices that can receive and transmit signal(s) from and to wireless devices through one or more antennas, or act as a wireless network component or apparatus that sends and/or receives data associated with voice, video, sound, and/or substantially any data-stream or signalling-stream between a set of subscriber stations—unless context warrants particular distinction(s) among the terms. Further, the data and signalling streams can be packetized or frame-based flows.

As used herein, "at least one cell" may refer to one or more base stations or cells which provide a network coverage to a geographic coverage area, thus the geographic area served by the one or more cells is termed as coverage area of the one or more cells. As used herein, "at least one macro cell" refers to high-powered base-stations (access points). As used herein, "at least one small cell" refer to low-powered base-stations (access points) with relatively smaller coverage range compared to macro base stations and deployed in hotspots or covered indoor environments like homes, offices, shopping complexes etc.

As used herein, "synchronizing" refers to matching the time difference in the start time of radio frames or symbols transmitted by different base stations within a pre-determined time range. For instance, without timing synchronization, two base stations that provide overlapping coverage may experience severe interference if, for example, the downlink transmissions of one base station overlap in time with the uplink transmissions of the other base station or vice versa.

Furthermore, the terms "user," "subscriber," "customer," "consumer," "agent,", "owner," and the like are employed interchangeably throughout the subject specification and related drawings, unless context warrants particular distinction(s) among the terms. It should be appreciated that such terms can refer to human entities, or automated components supported through artificial intelligence, e.g., a capacity to make inference based on complex mathematical formulations, that can provide simulated vision, sound recognition, decision making, etc. In addition, the terms "wireless network" and "network" are used interchangeable in the subject application, unless context warrants particular distinction(s) among the terms.

As used herein, a "processor" or "processing unit" includes one or more processors, wherein processor refers to any logic circuitry for processing instructions. A processor may be a general-purpose processor, a special-purpose processor, a conventional processor, a digital signal processor, a plurality of microprocessors, one or more microprocessors in association with a DSP core, a controller, a microcontroller, a low-end microcontroller, Application Specific Integrated Circuits, Field Programmable Gate Array circuits, any other type of integrated circuits, etc. The processor may perform signal coding data processing, input/output processing, and/or any other functionality that enables the working of the system according to the present disclosure. More specifically, the processor or processing unit is a hardware processor.

As used herein, a "communication unit" or a "transceiver unit" may include at least one of a "transmitter unit" configured to transmit at least one data and/or signals to one or more destination and a "receiver unit" configured to receive at least one data and/or signals from one or more source. The "communication unit" or the "transceiver unit" may also be configured to process the at least one data and/or signal received or transmitted at the "communication unit" or the "transceiver unit". Also, the "communication unit" or the "transceiver unit" may further include, any other similar units obvious to a person skilled in the art, required to implement the features of the present invention.

As used herein, "memory unit", "storage unit" and/or "memory" refers to a machine or computer-readable medium including any mechanism for storing information in a form readable by a computer or similar machine. For example, a computer-readable medium includes read-only memory ("ROM"), random access memory ("RAM"), magnetic disk storage media, optical storage media, flash memory devices or other types of machine-accessible storage media. Any of the computer-readable media herein can be implemented as non-transitory computer-readable media. Any of the methods herein can be implemented as one or more computer-readable media comprising computer-executable instructions that, when executed by a computing system, cause the computing system to perform the method.

As used herein, a "controller" or "control unit" includes at least one controller, wherein the controller refers to any logic circuitry for processing instructions. A controller may be a general-purpose controller, a special-purpose controller, a conventional controller, a digital signal controller, a plurality of microcontrollers, at least one microcontroller in association with a DSP core, a microcontroller, Application Specific Integrated Circuits, Field Programmable Gate Array circuits, any other type of integrated circuits, etc. The controller may perform signal coding, data processing, input/output processing, and/or any other functionality that enables the working of the system according to the present disclosure. More specifically, the controller or control unit is a hardware processor that comprises a memory and a processor. The memory is configured to store the modules and the processor is specifically configured to execute said modules to perform one or more processes which are described further below.

Hereinafter, exemplary embodiments of the present disclosure will be described in detail with reference to the accompanying drawings so that those skilled in the art can easily carry out the present disclosure.

Embodiments of the present disclosure may relate to a method and a system for synchronizing at least one small cell with at least one macro cell in a heterogeneous network. The subject invention relates to a method and a system for cost-effective and accurate synchronization of at least one small base station using an NB-IoT modem, embedded either internally or externally to the at least one small base station requiring synchronization, wherein the NB-IoT is capable of receiving Narrowband IoT signals. The narrowband (i.e. low bandwidth) properties of the NB-IoT coupled with signal repetition, increased accumulation time at receiver, etc., extend their coverage to deeper RF environments which is beyond the reach of conventional cellular technologies. The conventional techniques do not provide an efficient way for synchronizing at least one small base station with at least one macro cell. Compared to such techniques, various methods and apparatus described herein facilitate to synchronize at least one small cell with at least one macro cell in a heterogeneous network.

Figure 1:
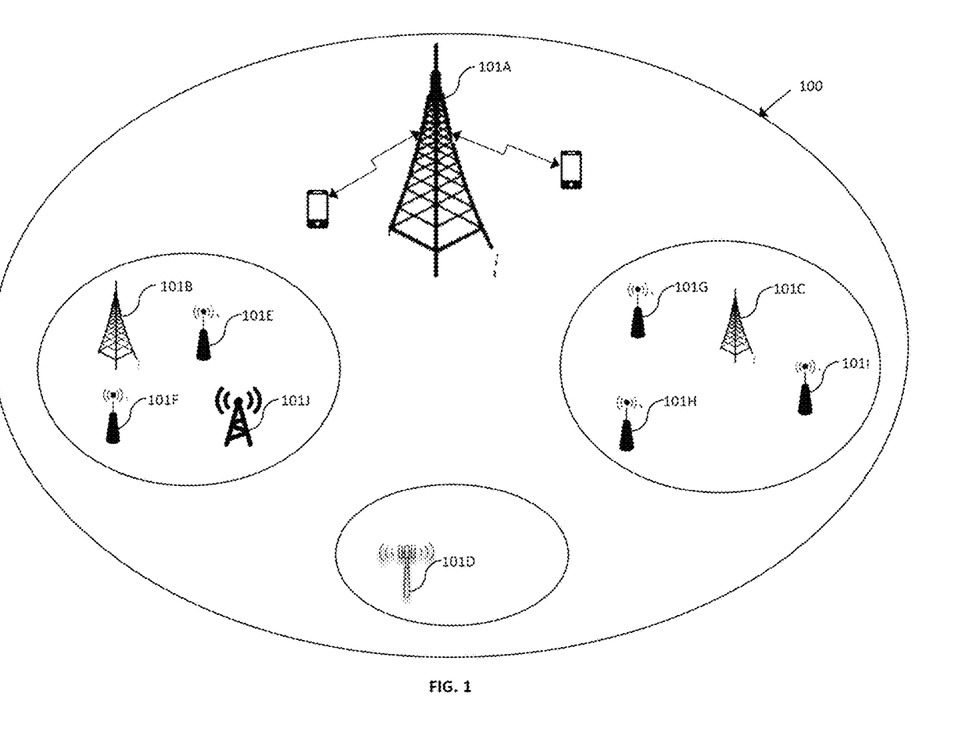
FIG. 1 illustrates an exemplary heterogeneous wireless communication network [100] diagram depicting a plurality of nodes connected in the heterogeneous wireless communication network [100], in accordance with exemplary embodiments of the present invention.

Referring to FIG. 1 illustrates an exemplary heterogeneous wireless communication network [100] diagram depicting a plurality of nodes connected to the wireless communication network [100], in accordance with exemplary embodiments of the present invention. As shown in FIG. 1, the wireless communication network [100] comprises a plurality of nodes [101A, 101B, 101C, 101D, 101E, 101F, . . . 101J, hereinafter collectively referred to as "101"] connected to each other. In an instance, the node [101A] is a macro base station providing wide area, nodes [101B, 101C, 101D] are small low-powered base stations employed in service areas having a higher density of users requiring high data rates. The nodes [101E, 101F, . . . 101I] are micro base stations, and node [101J] is a micro base station integrated with Wi-Fi radio to provide multi-technology hotspot capacity. Each of the nodes may further comprise of a memory unit, a processor, and a communication unit, all the components are connected to each other and work in conjunction to achieve the objects of the present invention.

The wireless communication network may include a local wireless communication site (or base station), which can use a licensed radio spectrum operated and controlled by a wireless service provider. In another instance of the present invention, the network may be a wired network, a wireless network, or a combination thereof. The network may be a single network or a combination of two or more networks. Further, the network provides a connectivity between the plurality of nodes [101]. The invention encompasses that a user equipment (or a user equipment) operated by a subscriber within a coverage area typically communicates with a core network via the base station. The user equipment can register with the base station and accordingly, the subscriber's communication, e.g., voice traffic, data traffic, can be routed to the subscriber through the base station utilizing the licensed radio spectrum. The base station can employ a backhaul network, e.g., broadband wired or wireless network backbone, to route packet communication, e.g., voice traffic, data traffic, data, to the core network.

Figure 2:
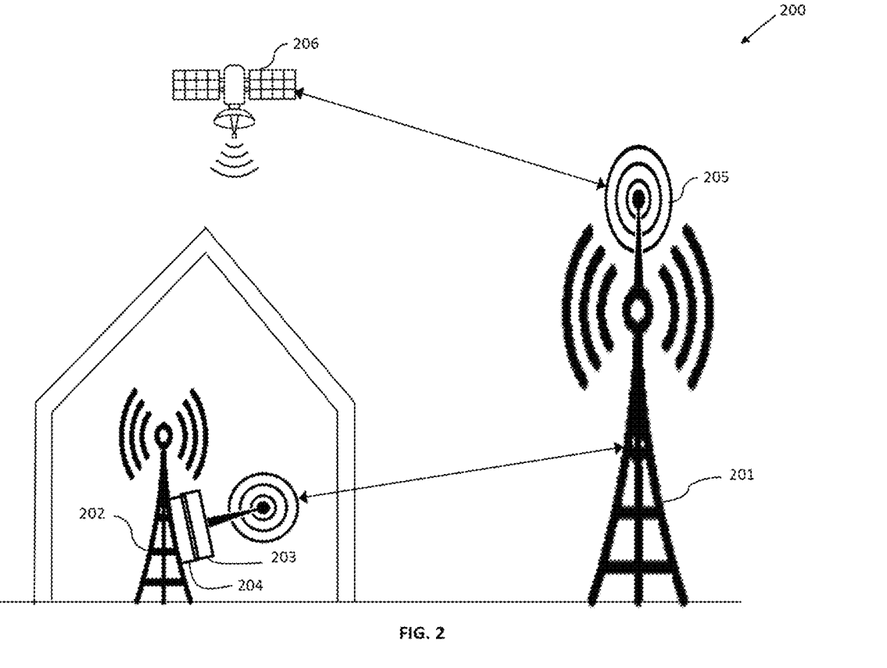
FIG. 2 illustrates an exemplary diagram of a system for synchronizing at least one small cell with at least one macro cell in a heterogeneous network, in accordance with exemplary embodiments of the present invention.

Referring to FIG. 2 illustrates an exemplary diagram of a system for synchronizing at least one small cell with at least one macro cell in a heterogeneous network, in accordance with exemplary embodiments of the present invention. The system comprises of at least one macro cell [201], at least one small cell [202], at least one NB-IoT modem [203], a synchronization processing module [204], at least one NB-IoT cell [205] and at least one communication satellite [206].

The at least one macro cell [201] is synchronized both in frequency and time with the help of a GNSS receiver receiving GNSS signal directly (or indirectly via coaxial cable) from an at least one communication satellite [206] (for example, GNSS satellite(s)) or using IEEE 1588 v2 over ideal-backhaul or through network listening of other synchronized base station. The at least one macro cell [201] is connected to at least one NB-IoT cell [205] for broadcasting narrowband synchronization signal and reference signal. Accordingly, the at least one NB-IoT cell [205] is configured to transmit at least one of a first synchronization signal and a second synchronization signal. The first synchronization signal comprises at least one of a cell identifier information and an initial timing information. The second synchronization signal comprises a residual time offset. In an instance of the present invention, the first synchronization signal is a Narrowband Primary Synchronization Signal (NPSS) and the second synchronization signal is a Narrowband Secondary Synchronization Signal (NSSS). The at least one NB-IoT cell [205] is also configured to transmit a reference signal, wherein the reference signal comprises at least one downlink channel information. In an instance of the present invention the reference signal is a Narrowband Reference Signal (NRS). In a preferred embodiment of the present invention, the at least one NB-IoT cell [205] is embedded in the at least one macro cell [201].

NPSS

In contrast to the LTE network which uses three Primary Synchronization Signals (PSS), all cells in NB-IoT network uses the same NPSS. This design reduces complexity in NPSS detection as a device only need to search for one NPSS. NPSS has a hierarchical structure, consisting of a base sequence and a code cover.

Base sequence is a length-11 frequency domain Zadoff-Chu sequence, whose nth frequency domain element is given by Equation-1.

$$p(n) = e^{\frac{-j\pi un(n+1+2q)}{N_{ZC}}} \quad \text{Equation-1}$$
$$n = 0, 1, \ldots, 10$$

where, the value of root index (u) is 5, cyclic shift (q) is 0 and sequence length ($N_{ZC}$) is 11. The waveform of the base sequence p(n), has a constant amplitude of 1, occupies the duration of one OFDM symbol and is repeated 11 times covering the last 11 OFDM symbols of subframe 5 of every to form the NPSS. On top, the code cover c(l) which is an 11-bit time-domain binary sequence, is applied as a cover sequence for the 11 repeated base waveforms to avoid the timing ambiguity as a result of the repetitions.

Value of the different symbol indices l in code cover c(l) is given by Equation-2.

$$c(l)=(1, 1, 1, 1, -1, -1, 1, 1, 1, -1, 1) \quad \text{Equation-2}$$

Due to this dual-layered structure, timing and frequency offset estimation can be decoupled in receiver implementation. Therefore, NPSS candidate detection can be conducted without estimating the Carrier Frequency Offset (CFO), which makes the performance robust against the large frequency uncertainties typical for low-cost devices. For NB-IoT modems operating at very low SNR, an autocorrelation based on a single 10 ms received segment would not be enough for detection. As a result, an accumulation procedure over multiple 10 ms segments is necessary. Because of the inherent NPSS design, multiple NPSS transmissions can be coherently combined by leveraging the quasi-stationary phase rotation between neighboring NPSS symbols. This will boost the diversity gain of reception, which is important for extended coverage and/or low SNR scenarios.

NSSS

Following the timing and frequency references established by NPSS signal, the NSSS signal detection can be conducted. The major tasks of NSSS processing include tracking of residual time and frequency offset and the detection of Narrowband Physical Cell Identity. NSSS is a length-132 upon Zadoff-Chu sequences with each element of the sequence mapped to a resource element of subframe #9 of every even subframes across all 12 subcarriers and last 11 OFDMA symbols. NSSS is generated by element-wise multiplication between a ZC sequence and a binary scrambling sequence. The root index, index of the scrambling sequence and the cyclic shift of the ZC sequence encode digital information e.g. Narrowband Physical Cell Identity and last three significant bits of the current System Frame Number (SFN).

The frequency-domain symbols for these NSSS REs are determined according to the sequence described by Equation-3.

$$p(n)=b_q(n)e^{-j2\pi\theta_f n}\widetilde{z_u}(n), n=0, 1, \ldots 131 \quad \text{Equation-3}$$

In essence, the NSSS of the cell with physical cell identity k is determined by an extended ZC sequence $\widetilde{z_u}(n)$, a binary scrambling sequence $b_q(n)$ and a phase shift $\theta_f$. The extended ZC sequence $\widetilde{z_u}(n)$ is obtained by first generating a length 131 ZC sequence of root index u as per Equation-4.

$$z_u(n) = e^{\frac{-j\pi un(n+1)}{131}}, \quad \text{Equation-4}$$
$$n = 0, 1, \ldots, 130$$

Then in the second step, $z_u(n)$ is extended to length 132 by repetition of first element as per Equation-5:

$$\widetilde{z_u}(n)=z_u(n \bmod 131), n=0, 1, \ldots, 131 \quad \text{Equation-5}$$

The root is determined by the physical cell identity k as per Equation-6:

$$u = (k \bmod 126) + 3 \qquad \text{Equation-6}$$

The binary scrambling sequence $b_q(n)$ is obtained based on length-128 Walsh-Hadamard sequence with the first four elements repeated at the end to make it length-132 sequence. The sequence index q is determined based on cell identity k as per Equation-7:

$$q = \left\lfloor \frac{N_{ID}^{N_{cell}}}{126} \right\rfloor \qquad \text{Equation-7}$$

In a cell, all NSSS transmission share same binary scrambling sequence and extended ZC sequence as these are determined by cell identity k. However, there is a phase shift $\theta_l$ between each successive transmission as:

$$\theta_l = \frac{33l}{132} \quad l = (SFN/2) \bmod 4$$

Clearly, $l \in \{0, 1, 2, 3\}$ and therefore, same NSSS sequence is repeated every 80 ms, therefore, NSSS design supports timing synchronization within the 80 ms repetition interval by matching the phase shift term. The NSSS can also be used to refine the fractional frequency estimation by correlation in the frequency domain at the higher sampling rate of 1.92 MHz.

The at least one small cell [202] is configured to trigger an NB-IoT modem [203] for a clock reference signal. In operation, the at least one small cell [202] continuously triggers the at least one NB-IoT modem [203] until the clock reference signal is transmitted by the at least one NB-IoT modem [203] to the at least one small cell [202]. For instance, the at least one small cell [202] may be located in an indoor environment (e.g. inside home, offices, shopping complexes), and unable to accurately synchronize with the at least one macro cell [201]. Accordingly, the at least one small cell [202] triggers the at least one NB-IoT modem [203] to receive the clock reference signal from the NB-IoT modem [203].

Figure 4:
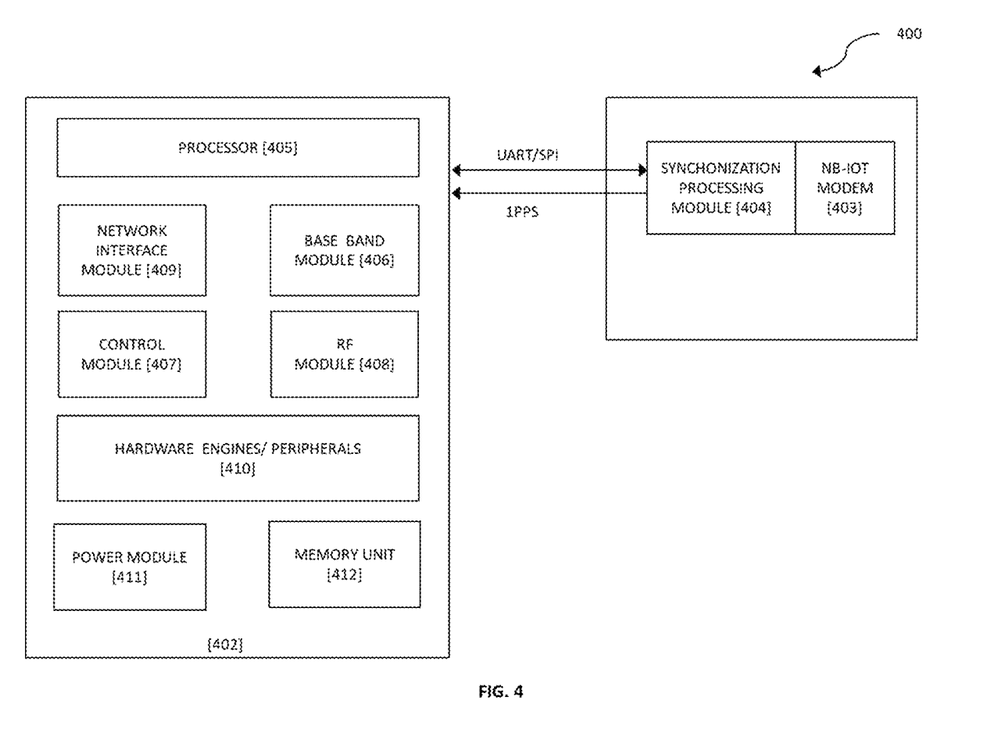
FIG. 4 illustrates an exemplary block diagram of a small cell connected to an NB-IoT modem, in accordance with exemplary embodiments of the present invention.

The at least one small cell [202] is configured to transmit the trigger for a clock reference signal to a synchronization processing module [204], and the synchronization processing module [204] is further configured to transmit the trigger for the clock reference to the at least one NB-IoT modem [203]. In an instance, the synchronization processing module [204, 404] comprises Universal Asynchronous Serial Receiver and Transmitter (UART) and Serial Peripheral Interface (SPI). The synchronization processing module [204, 404] communicates with the at least one small cell [202] through the UART/SPI interface. In operation, the synchronization processing module [204] receives the trigger commands from the at least one small cell [202] and in turn triggers the NB-IoT modem for the synchronization information.

The NB-IoT modem [203] is connected to the least one small cell [202], and the NB-IoT modem [203] is configured to detect a first synchronization signal. The first synchronization signal is transmitted by at least one NB-IoT cell [205] connected to the at least one macro cell [201]. The first synchronization signal comprises at least one of a cell identifier information and an initial timing information. Upon successful detection of the first synchronization signal, the NB-IoT modem [203] is configured to detect a second synchronization signal. The second synchronization signal is transmitted by the at least one NB-IoT cell [205] connected to the at least one macro cell [201]. The second synchronization signal comprises a residual time offset. Based on the first synchronization signal and the second synchronization signal, the at least one NB-IoT modem [203] synchronizes the at least one small cell [202] with the at least one macro cell [201].

In operation, the at least one NB-IoT modem [203] synchronizes with the at least one NB-IoT cell [205] based on at least on one of the first synchronization signal and the second synchronization signal. The at least one NB-IoT modem [203] generates a synchronization data comprising at least one of the first synchronization signal and the second synchronization signal. The at least one NB-IoT modem [203] transmits the synchronization data to the synchronization processing module [204]. Once the information is received at the synchronization processing module [204], it parses the information and generates a 1 PPS (Pulse Per Second) signal as an output which is a reference input to the at least one small cell [202]. The at least one small cell [202] synchronizes with the at least one macro cell [201] based on the synchronization data, i.e., the 1 PPS (Pulse Per Second) signal. Thus, the NB-IoT modem [203] is configured to receive narrowband synchronization and reference signals to periodically derive the timing and frequency information, and accordingly, the acquired timing and frequency information is periodically transferred to the at least one small cell [202] requiring synchronization.

Figure 3:
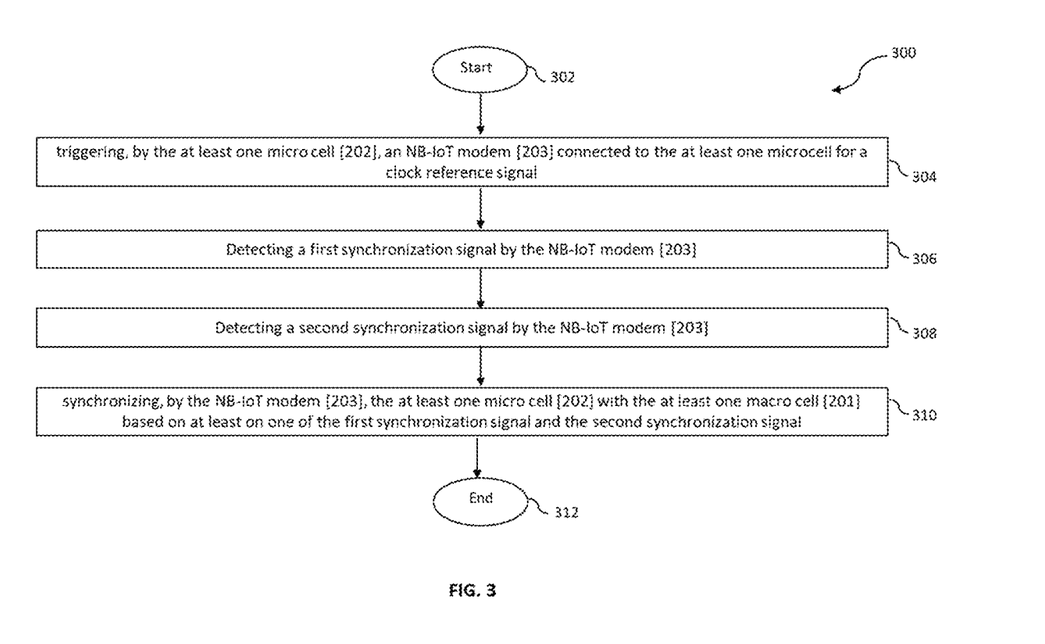
FIG. 3 illustrates an exemplary method flow diagram depicting a method for synchronizing at least one small cell with at least one macro cell in a heterogeneous network, in accordance with exemplary embodiments of the present invention.

Referring to FIG. 3 illustrates an exemplary method flow diagram [300], depicting a method for synchronizing at least one small cell with at least one macro cell in a heterogeneous network, in accordance with exemplary embodiments of the present invention. The method begins at step [302]. The method at step [304] comprises triggering, by the at least one small cell [202], at least one NB-IoT modem [203] connected to the at least one small cell [202] for a clock reference signal. The at least one NB-IoT modem [203] is continuously triggered by the at least one small cell [202] via a synchronization processing module [204] until the clock reference signal is transmitted by the at least one NB-IoT modem [203] to the at least one small cell [202]. The at least one small cell [202] is configured to transmit the trigger for a clock reference signal to a synchronization processing module [204], and the synchronization processing module [204] is further configured to transmit the trigger for the clock reference to the at least one NB-IoT modem [203]. In an instance of the present invention, the synchronization processing module [204, 404] comprises Universal Asynchronous Serial Receiver and Transmitter (UART) and Serial Peripheral Interface (SPI). The synchronization processing module [204, 404] communicates with the at least one small cell [202] through the UART/SPI interface. In operation, the synchronization processing module [204] receives the trigger commands from the at least one small cell [202] and in turn triggers the NB-IoT modem for the synchronization information. For instance, the at least one small cell [202] may be located in an indoor environment (e.g. inside home, offices, shopping complexes), and unable to accurately synchronize with the at least one base station [201]. Accordingly, the at least one small cell [202] triggers the at least one NB-IoT modem [203] to receive the clock reference signal from the NB-IoT modem [203].

At step [306], the at least one NB-IoT modem [203] detects a first synchronization signal. The first synchronization signal is transmitted by at least one NB-IoT cell [205]

connected to the at least one macro cell [201], and the first synchronization signal comprises at least one of a cell identifier information and an initial timing information. The first synchronization signal is a Narrowband Primary Synchronization Signal (NPSS). Upon successful detection of the first synchronization signal, at step [308], the at least one NB-IoT modem [203] detects a second synchronization signal. The second synchronization signal is transmitted by the at least one NB-IoT cell [205] connected to the at least one macro cell [201]. The second synchronization signal comprises a residual time offset. The second synchronization signal is a Narrowband Secondary Synchronization Signal (NSSS).

At step [310], the at least one NB-IoT modem [203] synchronizes the at least one small cell [202] with the at least one macro cell [201] based on at least one of the first synchronization signal and the second synchronization signal transmitted by the at least one NB-IoT cell [205]. In operation, the at least one NB-IoT modem [203] synchronizes with the at least one NB-IoT cell [205] based on at least on one of the first synchronization signal and the second synchronization signal. Further, the at least one NB-IoT modem [203] generates a synchronization data comprising at least one of the first synchronization signal and the second synchronization signal. And accordingly, the at least one NB-IoT modem [203] transmits the synchronization data to the at least one small cell [202]. The at least one small cell [202] synchronizes with the at least one macro cell [201] based on the synchronization data.

For instance, once the information is received at the synchronization processing module [204], it parses the information and generates a 1 PPS (Pulse Per Second) signal as an output which is a reference input to the at least one small cell [202]. The at least one small cell [202] synchronizes with the at least one macro cell [201] based on the synchronization data, i.e., the 1 PPS (Pulse Per Second) signal. Thus, the NB-IoT modem [203] is configured to receive narrowband synchronization and reference signals to periodically derive the timing and frequency information, and accordingly, the acquired timing and frequency information is periodically transferred to the at least one small cell [202] requiring synchronization. The method completes at step [312].

The method [300] of the present invention further encompasses the at least one NB-IoT modem [203] detecting a reference signal. The reference signal is transmitted by the at least one NB-IoT cell [205] connected to the at least one macro cell [201]. The reference signal comprises at least one downlink channel information. In an instance of the present invention, the reference signal is a Narrowband Reference Signal (NRS).

Referring to FIG. 4 illustrates an exemplary block diagram of a small cell [402] connected to an NB-IoT modem [403], in accordance with exemplary embodiments of the present invention. The small cell [402] comprises of a memory unit [412] and a processor [405], both the components connected to each other and working in conjunction to achieve the objectives of the present invention. The processor [405] is connected to the memory unit [412], said processor [405] is configured to generate for a trigger for a clock reference signal when the small cell [402] is to be synchronized with a macro cell. The processor [405] is further configured to transmit the trigger for receiving a clock reference signal to the NB-IoT modem [403] via a synchronization processing module [404]. The synchronization processing module [404] communicates with the processor [405] through the UART/SPI interface. In operation, the synchronization processing module [404] receives the trigger commands from the at least one small cell [402] and in turn triggers the NB-IoT modem [403] for the synchronization information.

The NB-IoT modem [403] is configured to detect a first synchronization signal. The first synchronization signal is transmitted by at least one NB-IoT cell [205] connected to the at least one macro cell [201]. The first synchronization signal comprises at least one of a cell identifier information and an initial timing information. Upon successful detection of the first synchronization signal, the NB-IoT modem [203] is configured to detect a second synchronization signal. The second synchronization signal is transmitted by the at least one NB-IoT cell [205] connected to the at least one macro cell [201]. The second synchronization signal comprises a residual time offset. Based on the first synchronization signal and the second synchronization signal, the at least one NB-IoT modem [203] synchronizes the at least one small cell [202] with the at least one macro cell [201].

The small cell [402] further comprises of a network interface module [409], a baseband module [406], a control module [407], an RF module [408], a power module [411] and a plurality of hardware peripherals [410], all connected to each other and to the processor [405] and the memory unit [412]. The network interface module [409] is configured to manage the connection of the small cell [402] with the heterogenous network. The base band module [406] is configured to process the baseband for the small cell [402]. The RF module [408] is configured to transmit and receive radio signals at the small cell [402]. The plurality of hardware peripherals [410] comprises of transforms, encoders and decoders.

In one of the preferred embodiments the at least one NB-IoT modem [403] and the synchronization processing module [404] is present inside the at least one small cell [202]. Accordingly, the small cell comprises of the memory unit [412], the processor [405], the network interface module [409], the base band module [406], the control module [407], the RF module [408], the power module [411], the plurality of hardware peripherals [410], the synchronization processing module [404] and the at least one NB-IoT modem [403].

Figure 5:
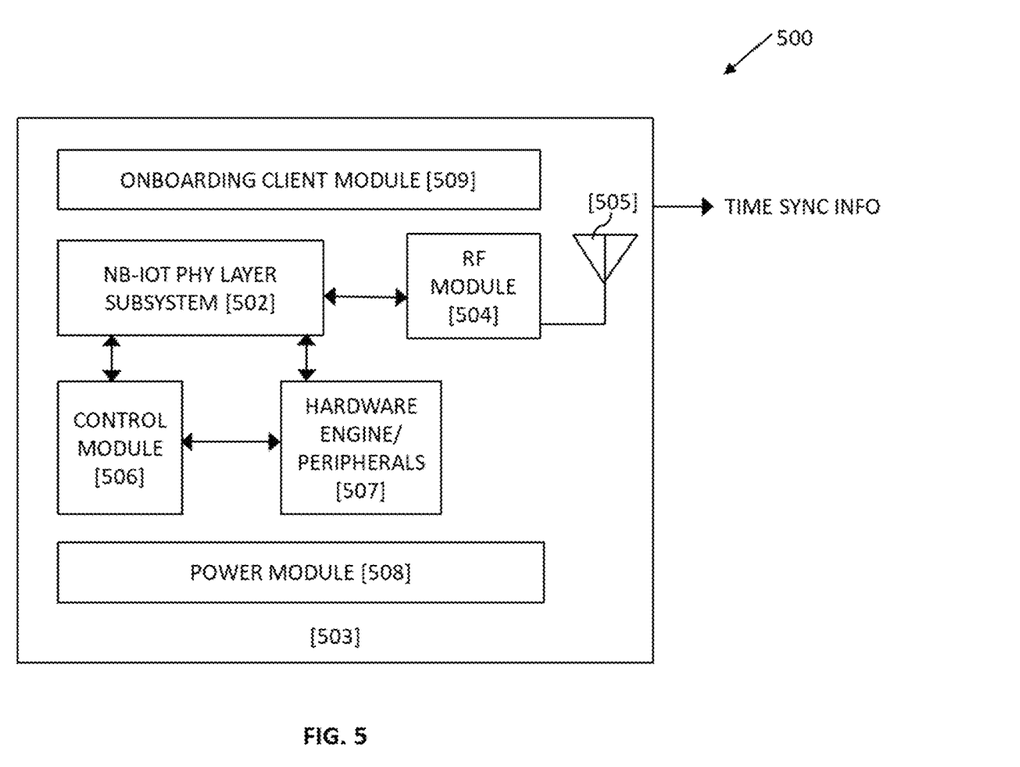
FIG. 5 illustrates an exemplary block diagram of an NB-IoT modem, in accordance with exemplary embodiments of the present invention.

Referring to FIG. 5 illustrates an exemplary block diagram of an NB-IoT modem [503], in accordance with exemplary embodiments of the present invention. The NB-IoT modem [503] comprises of an NB-IoT physical layer subsystem [502], an RF module [504], an antenna [505], a control module [506], a plurality of hardware peripherals [507], a power module [508] and an onboarding client module [509]. The RF module [504] along with radio antenna [505] is configured to enable communication over the heterogenous network. The onboarding client module [509] is configured to facilitate onboarding of the NB-IoT modem [503] with a sever onto a network, and the NB-IoT physical layer subsystem [502] implements the minimal required IoT functionality in combination with the plurality of hardware peripherals including, but not limited to, encoders and decoders. The control module [506] manages the plurality of hardware engines and peripherals. The power module [508] is configured to manage the power supply at the NB-IoT modem [503].

For instance, the design of the narrowband synchronization signals (say, NPSS and/or NSSS) adapted by 3GPP for NB-IoT provides a timing accuracy of ±2.5 µs and frequency accuracy of ±50 Hz, even in deep indoor environment having a maximum coupling loss (MCL) of 164 dB. The synchronization accuracies achieved by the narrowband synchronization signals are better than the synchronization accuracies requirement (timing accuracy of 3 μsec and frequency accuracy of ±0.25 ppm i.e. 212.5 Hz for 850 MHz band) set by 3GPP for Small Base Stations with cell radius less than 500 m. Therefore, the method and system of the present invention for synchronizing at least one small cell with at least one macro cell in a heterogeneous network using an NB-IoT modem provides accurate timing and frequency synchronization to the small cells.

Figure 6:
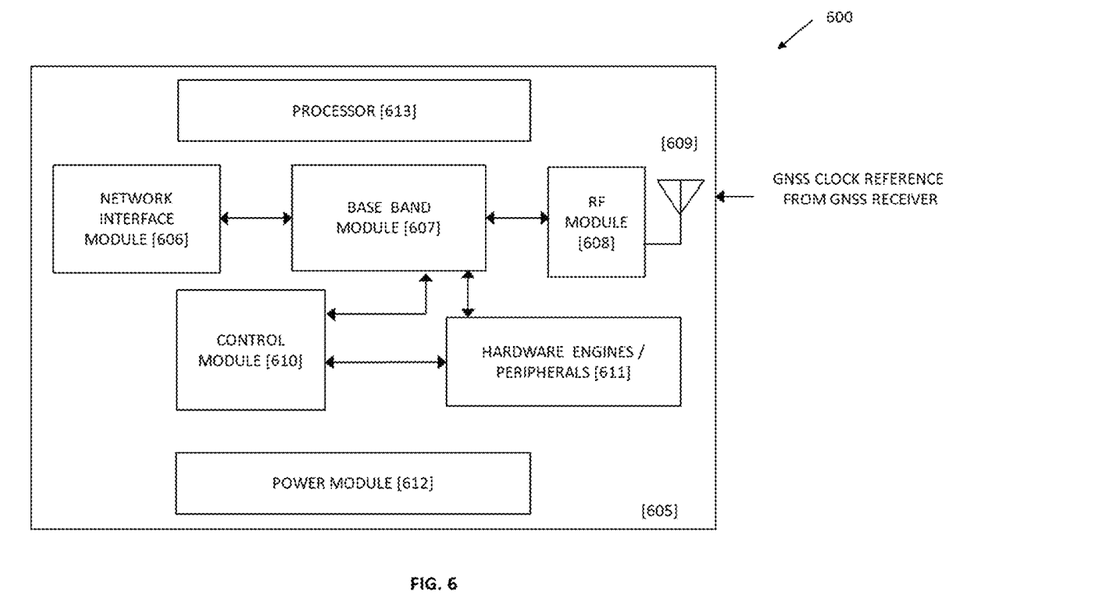
FIG. 6 illustrates an exemplary block diagram of an NB-IoT cell, in accordance with exemplary embodiments of the present invention.
Figure 7:
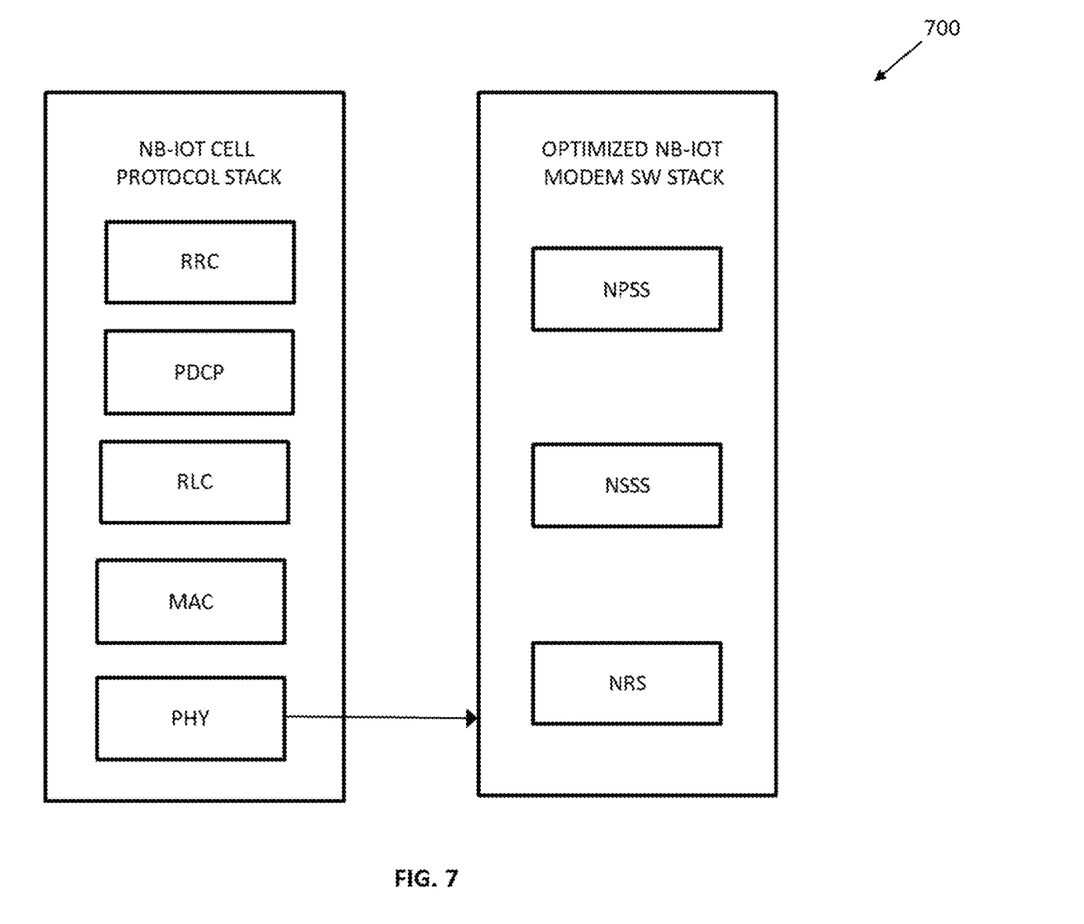
FIG. 7 illustrates an exemplary signal exchange and stacking between the NB-IoT modem and the NB-IoT cell, in accordance with exemplary embodiments of the present invention.

Referring to FIG. 6 illustrates an exemplary block diagram of an NB-IoT cell [605], in accordance with exemplary embodiments of the present invention. The NB-IoT cell comprises a network interface module [606], a base band module [607], an RF module [608], an antenna [609], a control module [610], a plurality of hardware peripherals [611], a power module [612] and a processor [613]. The RF module [608] along with radio antenna [609] provides wireless access to the NB-IoT client devices according to the 3GPP NB-IoT protocols. The control module [610] is configured to manage and provision the NB-IOT wireless access points. The hardware peripherals [611] include, but are not limited to, encoders and decoders. The base band module [607] is configured to process the baseband for the NB-IoT cell [605]. The NB-IoT processor [613] is configured to run the protocol stack as shown in FIG. 7 illustrating an exemplary signal exchange and stacking the at least one NB-IoT modem and the at least one NB-IoT cell, in accordance with exemplary embodiments of the present invention. The processor [613] is also configured to receive the clock reference.

Figure 8:
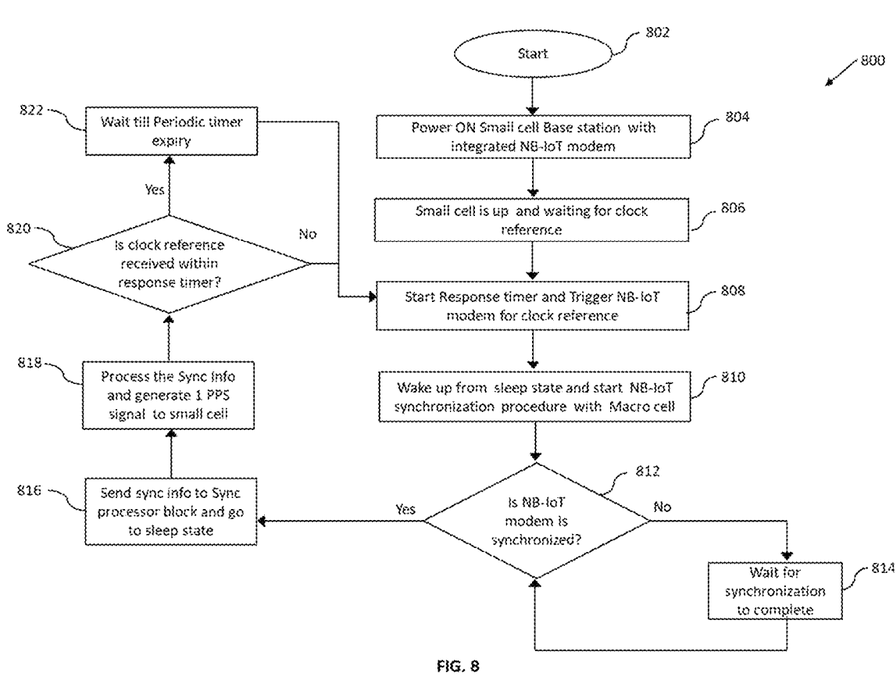
FIG. 8 illustrates an exemplary signal flow diagram depicting synchronizing at least one small cell with at least one macro cell in a heterogeneous network, in accordance with exemplary embodiments of the present invention.

Referring to FIG. 8 illustrates an exemplary signal flow diagram depicting synchronizing at least one small cell with at least one macro cell in a heterogeneous network, in accordance with exemplary embodiments of the present invention. The flow diagram starts at step [802]. At step [804], at least one small cell [201] integrated with at least one NB-IoT modem is switched ON, and is required to be synchronized with the at least one macro cell [201]. After powerup, at step [806], the at least one small cell [202] triggers the at least one NB-IoT modem [203] for deriving the clock reference through UART/SPI interface via synchronization processing module [204, 404] and starts a response timer at step [808]. If the clock reference is not received from the at least one NB-IoT modem [203], at step [820], then repeat the triggering process. Once trigger is received, at step [810], the at least one NB-IoT modem [203] wakes up from sleep state and starts synchronization procedure with macro cell as follows. At step [812], the at least one NB-IoT modem [203] starts searching for NPSS sequence detection which serves the purpose of providing initial timing information. Due to the inherent NPSS design, the at least one NB-IoT modem [203] combines multiple NPSS transmissions coherently and this will boost the diversity gain of reception, which is important for extended coverage. Following the successful timing reference established by NPSS signal, the at least one NB-IoT modem [203] starts NSSS signal detection which serves the purpose of tracking residual time offset. In NB-IoT due to repetitions in coverage levels 2 and 3, the detection time of NPSS and NSSS can be more. Hence the response timer value should be more than the sum of maximum detection time of NPSS and NSSS. Once the at least one NB-IoT modem [203] is synchronized with at least one macro cell [201], at step [816], transfer the information to synchronization block and go to sleep mode. The synchronization block will process the received sync information and send 1 PPS signal to small cell. After receiving the clock reference, at step [818], use the same and start the periodic timer. At step [822], upon expiry of periodic timer, the present invention encompasses repeating the above process from step [808].

In an instance of the present invention, the remaining NB-IoT signals/information (apart from the one mentioned above) transmitted over channels like Narrowband Physical Broadcast Channel (NPBCH), Narrowband Physical Downlink Control Channel (NPDCCH) and Narrowband Physical Downlink Shared Channel (NPDSCH), do not aid in synchronization. Therefore, the above said at least one NB-IoT modem can be optimized is such a way that it does not decode the information (e.g. System Information Blocks, Downlink Control Information, Downlink Transport Blocks etc.,) transmitted over those channels. Furthermore, the above said at least one NB-IoT modem can also be optimized to not initiate random access procedure over Narrowband Physical Random-Access Channel or transmit any uplink data on Narrowband Physical Uplink Shared Channel. The above said optimization will also result in zero signaling overhead on the synchronization source i.e. NB-IoT Base Station.

In another instance, the at least one NB-IoT modem supports a Maximum Coupling Loss (MCL) of 164 dB providing a coverage extension 20 dB compared to legacy LTE systems. Therefore, the above said at least one NB-IoT modem and, hence, the at least one small base station may easily achieve synchronization while being installed in locations with excessive penetration losses, e.g. inside buildings, shopping malls, etc. In yet another instance, the at least one NB-IoT modem and in-turn the at least one small base station can leverage the benefit of extended coverage of NB-IoT systems, to derive the synchronization information directly from the parent synchronization source (GNSS synchronized NB-IoT Base station) or the synchronization source closest to it (via least possible hops), thus, eliminating the synchronization inaccuracies cascaded across multi-hops, as suffered by conventional Network Listening methods of synchronization in deeper coverage.

Thus, the present invention provides a novel solution for the technical problem of accurately synchronizing at least one small cell with at least one macro cell in a heterogeneous network. Particularly, the solution of the present invention provides technical effect of using NB-IoT technology for synchronizing at least one small cell with at least one macro cell in a heterogeneous network, thus leveraging the extended coverage characteristics of NB-IoT systems, that allows NB-IoT synchronization signals to get decoded in extreme RF conditions, through a low-cost modem, showing the desired synchronization accuracy (mentioned earlier) for small base stations which is achieved by decoding the above-mentioned signals even at MCL of 164 dB. NB-IoT is a narrow band cellular technology which is used as illustration of the embodiments, by way of example and is not the limitation. The present invention is equally applicable to use any of the existing (Narrowband Internet of Things, Extended Coverage GSM, etc.) or evolving low bandwidth cellular technologies (e.g. MMTC in 5G NR), designed or intended to provide wide area network, all of which is encompassed by the present invention.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

We claim:

1. A method for synchronizing at least one small cell with at least one macro cell in a heterogeneous network, the method comprising:
   triggering, by the at least one small cell, at least one NB-IoT modem connected to the at least one small cell to receive a clock reference signal from the at least one NB-IoT modem;
   detecting a first synchronization signal by the at least one NB-IoT modem, wherein
      the first synchronization signal is transmitted by at least one NB-IoT cell connected to the at least one macro cell, and
      the first synchronization signal comprises at least one of a cell identifier information and an initial timing information;
   detecting a second synchronization signal by the at least one NB-IoT modem, wherein
      the second synchronization signal is transmitted by the at least one NB-IoT cell connected to the at least one macro cell, and
      the second synchronization signal comprises a residual time offset; and
   synchronizing, by the at least one NB-IoT modem, the at least one small cell with the at least one macro cell based on at least one of the first synchronization signal and the second synchronization signal transmitted by the at least one NB-IoT cell.

2. The method as claimed in claim 1, wherein synchronizing the at least one small cell with the at least one macro cell further comprises:
   synchronizing the at least one NB-IoT modem with the at least one NB-IoT cell based on at least one of the first synchronization signal and the second synchronization signal;
   generating, by the at least one NB-IoT modem, a synchronization data comprising at least one of the first synchronization signal and the second synchronization signal;
   transmitting, by the at least one NB-IoT modem, the synchronization data to the at least one small cell via a synchronization processing module; and
   synchronizing, by the at least one small cell, with the at least one macro cell based on the synchronization data.

3. The method as claimed in claim 2, the method further comprising:
   generating, by the synchronization processing module, a 1 pulse per second (PPS) signal based on the synchronization data; and
   transmitting, by the synchronization processing module, the 1 PPS signal to the at least one small cell.

4. The method as claimed in claim 1, wherein the at least one NB-IoT modem is continuously triggered by the at least one small cell via a synchronization processing module until the clock reference signal is transmitted by the at least one NB-IoT modem to the at least one small cell.

5. The method as claimed in claim 1, wherein the first synchronization signal is a Narrowband Primary Synchronization Signal (NPSS) and the second synchronization signal is a Narrowband Secondary Synchronization Signal (NSSS).

6. The method as claimed in claim 1, the method further comprising:
   detecting, by the at least one NB-IoT modem, a reference signal wherein
      the reference signal is transmitted by the at least one NB-IoT cell connected to the at least one macro cell,
      the reference signal comprises at least one downlink channel information, and
      the reference signal is a Narrowband Reference Signal (NRS);
   synchronizing, by the at least one NB-IoT modem, the at least one small cell with the at least one macro cell based on at least the reference signal.

7. A system for synchronizing at least one small cell with at least one macro cell in a heterogeneous network, the system comprising:
   at least one macro cell;
   at least one NB-IoT cell connected to the at least one macro cell, said at least one NB-IoT cell configured to transmit at least one of a first synchronization signal and a second synchronization signal, wherein
      the first synchronization signal comprises at least one of a cell identifier information and an initial timing information, and
      the second synchronization signal comprises a residual time offset;
   the at least one small cell configured to trigger at least one NB-IoT modem to receive a clock reference signal from the at least one NB-IoT modem;
   the at least one NB-IoT modem connected to the at least one small cell, said at least one NB-IoT modem configured to:
      detect at least one of the first synchronization signal and the second synchronization signal, and
      synchronize the at least one small cell with the at least one macro cell based on at least one of the first synchronization signal and the second synchronization signal.

8. The system as claimed in claim 7, the system further comprising a synchronization processing module connected to the at least one small cell and the at least one NB-IoT modem, said synchronization processing module configured to:
   receive a trigger for the clock reference signal from the at least one small cell,
   transmit the clock reference signal to the at least one NB-IoT modem,
   receive at least one of the first synchronization signal and the second synchronization signal from the at least one NB-IoT modem,
   generate a 1 pulse per second (PPS) signal based on the first synchronization signal and the second synchronization signal; and
   transmitting, by the synchronization processing module, the 1 PPS signal to the at least one small cell.

9. The system as claimed in claim 8, wherein the synchronization processing module comprises Universal Asynchronous serial Receiver and Transmitter (UART) and Serial Peripheral Interface (SPI).

10. The system as claimed in claim 7, wherein the at least one NB-IoT modem is further configured to:
   synchronize with the at least one NB-IoT cell connected to the at least one macro cell based on at least one of the first synchronization signal and the second synchronization signal;
   generate a synchronization data comprising at least one of the first synchronization signal and the second synchronization signal; and
   transmit the synchronization data to the at least one small cell.

11. The system as claimed in claim 10, wherein the at least one small cell is further configured to synchronize with the at least one macro cell based on the synchronization data.

12. The system as claimed in claim 7, wherein:
the at least one macro cell is further configured to transmit a reference signal, wherein the reference signal comprises at least one downlink channel information;
the at least one NB-IoT modem is further configured to:
  detect the reference signal, and
  synchronize the at least one small cell with the at least one macro cell based on at least the reference signal.

13. A small cell comprising:
a memory unit;
a processor connected to the memory unit, said processor configured to generate for a trigger to receive a clock reference signal from the at least one NB-IoT modem;
the at least one NB-IoT modem connected to the memory unit and the processor, said at least one NB-IoT modem configured to:
  receive the trigger for the clock reference signal,
  detect a first synchronization signal, wherein
    the first synchronization signal is transmitted by at least one NB-IoT cell connected to at least one macro cell, and
    the first synchronization signal comprises at least one of a cell identifier information and an initial timing information,
  detect a second synchronization signal, wherein
    the second synchronization signal is transmitted by the at least one NB-IoT cell connected to the at least one macro cell, and
    the second synchronization signal comprises a residual time offset; and
  synchronize the at least one small cell with the at least one macro cell based on at least one of the first synchronization signal and the second synchronization signal.

14. The small cell as claimed in claim 13, the small cell further comprising a synchronization processing module connected to the memory unit, the NB-IoT modem and the processor, said synchronization processing module configured to:
receive the trigger for the clock reference signal from the processor;
transmit the clock reference signal to the at least one NB-IoT modem;
receive at least one of the first synchronization signal and the second synchronization signal from the at least one NB-IoT modem;
generate a 1 pulse per second (PPS) signal based on the first synchronization signal and the second synchronization signal; and
transmitting, by the synchronization processing module, the 1 PPS signal to the processor.

* * * * *